3,099,695
VAPOR PHASE FLUORINATION WITH ClF AND ClF$_3$
Jan Muray, Widnes, England, assignor to Imperial Chemical Industries Limited, London, England, a corporation of Great Britain
No Drawing. Filed Aug. 4, 1960, Ser. No. 47,390
9 Claims. (Cl. 260—653.8)

This invention relates to a process wherein organic halogen compounds are produced by reaction of halogenated hydrocarbons with chlorine fluorides. More particularly it relates to a process for the manufacture of organic compounds containing fluorine by reaction in the vapour phase of chlorine fluorides with halogen-substituted hydrocarbons in which none or not all of the halogen is fluorine.

Halogenated hydrocarbons containing fluorine or fluorine together with other halogen substituents, particularly compounds of the methane, ethane and propane series, are very useful as refrigerants, as propellents in low-pressure aerosols, and as solvents for special purposes. Heretofore such compounds have usually been prepared by reaction of organic compounds containing chlorine with hydrofluoric acid in the presence of an antimony salt catalyst. There are, however, well known difficulties in carrying out such reactions. The reaction mixture becomes severely corrosive, necessitating frequent replacement of plant items or the use of special equipment; it is often necessary to work under superatmospheric pressure in order to obtain highly fluorinated products.

It is known from British specifications Nos. 738,289 and 774,737 that fluorinated hydrocarbons can be obtained by reaction of certain liquid or solid halogenated hydrocarbons in which not all of the halogen is fluorine with chlorine trifluoride or chlorine monofluoride. Reaction is carried out in the liquid phase by passing the chlorine fluoride vapour into the liquid reactant or, in the case of a solid reactant by bringing the chlorine fluoride into contact with the reactant suspended in a carrying liquid. In order to moderate the reaction at the start it is sometimes necessary to dilute the chlorine fluoride with an inert gas because of the high reactivity of the chlorine fluorides.

These processes provide useful alternatives to the catalysed hydrofluoric acid reaction for the production of high-boiling products such as those disclosed in the above-mentioned British specifications, e.g. the oils and waxes of B.P. 738,289 and the fluorochlorobutanes of B.P. 774,737. When, however, an attempt is made to prepare highly fluorinated products of the methane, ethane and propane series by the above-mentioned reactions of chlorine fluorides in the liquid-phase, it is found that the extent to which other halogens can be replaced by fluorine is limited by the boiling points of the intermediately produced partially fluorinated products. In general as the proportion of fluorine to other halogen increases the boiling point of the compound decreases, and it is found that a stage is reached at which further reaction is impossible because of the volatility of the reaction mixture.

We have now found that these difficulties can be avoided and that volatile halogenated saturated and unsaturated compounds in which none or not all of the halogen is fluorine can be fluorinated to give good yields of the desired products by reaction in the vapour phase with chlorine trifluoride and/or chlorine monofluoride. Although the chlorine fluorides are known to be very vigorous fluorinating agents we have found, and this is the more surprising, that these vapour phase reactions can be carried out with very little fragmentation of the organic molecules and that excellent yields of the desired products are obtained even when working at elevated temperatures. We have, for example, obtained high yields of useful fluorinated ethanes by reaction of the chlorine fluorides with the vapours of halogenated ethylenes and ethanes at temperatures up to approximately 500° C.

According to the present invention, there is provided a process for the manufacture of organic compounds containing fluorine which comprises bringing chlorine trifluoride or chlorine monofluoride or both these chlorine fluorides consecutively into reaction in the vapour phase with a hydrocarbon containing halogen substituents, none or not all of which are fluorine.

The organic starting material may suitably be a fully halogenated paraffinic or olefinic hydrocarbon, or it may be a halogenated paraffinic hydrocarbon containing a proportion of unsubstituted hydrogen. When hydrogen is present, in general it is preferred that the atomic ratio of such hydrogen to halogen atoms does not exceed 1:1. If higher proportions of hydrogen are present the reaction with chlorine fluorides may become so vigorous that extensive fragmentation of the organic material occurs and there is a danger of inflaming or even explosion.

Although the halogenated starting materials may contain various halogen substituents the invention is particularly useful in its application to halogenated hydrocarbons containing chlorine substituents or chlorine and fluorine substituents only, since these materials are often more readily available than those containing other halogen substituents. Examples of particularly suitable starting materials are olefinic materials such as perchloroethylene and hexachloropropene, and paraffinic materials such as the chlorofluoromethanes, ethanes and propanes in which some unsubstituted hydrogen may or may not be present as hereinbefore discussed.

Because the process of the invention is carried out in the vapour phase, low boiling reactants may be employed without the need for pressurised equipment. The invention is therefore very applicable to the production of highly fluorinated methanes, ethanes and propanes which, as aforementioned, are useful as refrigerants, aerosol propellents and solvents. Nevertheless, the invention is not limited thereto, for it will be understood that it is applicable to the use as raw material of any halogenated hydrocarbon which is sufficiently volatile to be brought into reaction in the vapour phase at temperatures up to about 500° C. We have found furthermore that by using the chlorine fluorides as vapour-phase fluorinating agents halogens other than fluorine may be replaced progressively by fluorine in halogenated hydrocarbons so that, by varying the proportion of chlorine fluoride used, a series of products of increasing fluorine content may be obtained from a single starting material.

In order to carry out the invention the vapours of the chlorine fluoride and the organic starting material must be brought together so that they react at elevated temperature. This can be brought about in various ways and most conveniently by passing the vapours together through a reaction tube provided with external heating means. Since the reactions are exothermic it may be necessary in certain cases to cool the reaction zone once the reaction has started. The amount of cooling needed will not however be very great. We prefer to employ a nickel reaction tube with external electric heating and air cooling. By controlling the feed rate of the reactants as well as adjusting the heating and cooling means we have found that the reaction temperature can be maintained within approximately ±20° C. of the desired value. It is also found that in order to obtain high conversion the reactant vapours should be well mixed, in stoichiometric proportions, and should come into contact with a large area of heated surface during the reaction period. This can be ensured by providing the reaction tube with a suitable packing, and we have found that nickel turnings provide a very convenient packing material. The product vapours issuing from the reaction tube may be recovered in known manner, for example by cooling and scrubbing with solid sodium chloride and aqueous alkali to remove acid by-products, chlorine and any unreacted chlorine fluorides, followed by condensing and fractionating the organic products in order to separate the desired components.

Both chlorine trifluoride and chlorine monofluoride are useful reagents for vapour phase fluorination according to the invention. Chlorine trifluoride has the advantage, however, of being a more efficient reagent for adding fluorine to double bonds as in olefinic materials. On the other hand it is found that chlorine monofluoride enables other halogens to be replaced by fluorine in saturated compounds with less fragmentation of the organic molecules than when chlorine trifluoride is used. There is thus considerable flexibility in methods of carrying out the invention. For example an olefinic starting material may be allowed to react in the vapour phase with chlorine monofluoride only, whereby saturation of the double bonds with halogen is brought about and substitution of other halogen by fluorine also takes place to the desired extent. Alternatively the olefinic starting material may be allowed to react in the vapour phase first with sufficient chlorine trifluoride to saturate the double bonds, and the product gas stream from this reaction may then be allowed to react with chlorine monofluoride in order to bring about the desired substitution of other halogen by fluorine. The two reactions may be carried out in a continuous manner without any intermediate separation of reaction products by employing two consecutive reaction zones. Yet again within the scope of the invention, fluorine may be introduced into a halogenated olefinic starting material by a modified procedure. The double bonds of the olefinic material may first be saturated by allowing the material to react with chlorine trifluoride in the liquid phase in known manner, and the paraffinic material thereby obtained may then be brought into reaction in the vapour phase with chlorine monofluoride as taught herein, in order to obtain the desired degree of fluorination.

A vapour phase reaction according to the invention may be carried out by passing the organic starting material together with the chlorine fluoride through a single reaction zone or the mixed vapours may be passed through two or more reaction zones consecutively, with or without addition of further quantities of chlorine fluoride to the vapour stream between the successive reaction zones. When more than one reaction zone is employed it is often an advantage to employ different reaction temperatures in the different zones, and it will usually be suitable for the temperature in the first such zone to be lower than in succeeding zones.

When the organic starting material contains a proportion of hydrogen it may be brought into vapour phase reaction with chlorine trifluoride or chlorine monofluoride direct. As an additional feature of the invention, however, the vaporous organic material may first be passed through a hot reaction zone in admixture with sufficient chlorine gas to bring about substitution of substantially all the hydrogen by chlorine, and the gas stream from this first reaction zone may then be allowed to react in one or more further reaction zones with a chlorine fluoride in order to obtain the desired substitution of other halogens by fluorine. By working in this manner the reaction with chlorine fluoride is rendered less vigorous and more easy to control. The hot product gases from the first reaction zone, where chlorination takes place, may be passed to the fluorination stage without any intermediate purification; it is, however, possible to reduce the consumption of chlorine fluoride in the fluorination stage by submitting the gases issuing from the chlorination zone to cooling and scrubbing, in order to remove the hydrogen chloride produced in the chlorination stage, before the gases are brought into contact with chlorine fluoride. If the hydrogen chloride is not removed before the fluorination stage it will react with some of the chlorine fluoride to produce unwanted hydrofluoric acid.

Various ways in which the invention may be performed are more fully described in the following examples.

*Example 1*

A nickel reaction tube 3 ft. long x 1 in. diameter was packed with nickel turnings and provided with an external electrically-heated enclosure. The vapour from boiling perchloroethylene was passed through the tube in admixture with an approximately equimolecular proportion of chlorine trifluoride vapour and the reaction temperature as measured by a chromel-alumel thermocouple was maintained at approximately 172° C. In 2.5 hours 95 g. of perchloroethylene and 50 g. of chlorine trifluoride were passed through the reactor. The gases leaving the reactor were separated from by-products by scrubbing with solid sodium chloride followed by caustic soda, condensing and fractionating. 74.6 g. of product were obtained which was mainly $C_2Cl_4F_2$ and $C_2Cl_5F$, with small amounts of more highly fluorinated compounds.

*Example 2*

Over a period of 5 hours 470 g. of perchloroethylene in the vapour state were passed through the reactor of Example 1 in admixture with 520 g. of chlorine monofluoride with a reaction temperature of 252±4° C., and the hot exit gases were passed immediately through a second and similar reactor at 447±12° C. 389.4 g. of product, consisting mainly of $C_2Cl_2F_4$, $C_2ClF_5$ and $C_2Cl_3F_3$, were obtained.

*Example 3*

Over a period of 3 hours 101 g. of perchloroethylene vapour and 30.5 g. of chlorine trifluoride were passed through the reactor of Example 1 at a temperature of 169±3° C., and the product gases were led through a second and similar reactor through which was fed also in the same direction at a steady rate a total of 101 g. of chlorine monofluoride vapour, the temperature in the second reactor being 444±6° C. 102.8 g. of product were obtained, approximately 75% of which was

$$C_2Cl_2F_4$$

*Example 4*

Trichlorotrifluoroethane isolated from the product of a two-stage reaction of perchloroethylene with chlorine trifluoride followed by chlorine monofluoride in the vapour phase was used as raw material for a further vapour phase reaction with chlorine monofluoride according to the invention. 94 g. of $C_2Cl_3F_3$ vapour together with 35.5 g. of chlorine monofluoride vapour were passed through the reactor of Example 1 with a reaction temperature of 482±3° C. over a period of 1 hour. 79.1 g. of product were obtained of which approximately 80% was $C_2Cl_2F_4$.

*Example 5*

291 g. of trichlorodifluoroethane ($C_2Cl_3F_2H$) prepared by the process of co-pending application No. 46,353, filed August 1, 1960 were vaporised and passed over a period of 6 hours through the reactor of Example 1 in admixture with 355 g. of chlorine monofluoride with a reaction temperature of 441±4° C. 236 g. of product, mainly $C_2Cl_2F_4$ and $C_2ClF_5$ and a smaller amount of $C_2Cl_3F_3$ were obtained.

*Example 6*

Over a period of 6.65 hours 331 g. of trichlorodifluoroethane in the vapour state were passed through the reactor of Example 1 in admixture with 165 g. of chlorine gas at a temperature of 483±11° C., and the exit gases were passed immediately through a second and similar reactor together with a total of 365 g. of chlorine monofluoride, the temperature of the second reactor being 436±11° C. 287.1 g. of product were obtained consisting mainly of $C_2Cl_2F_4$ with smaller amounts of $$C_2ClF_5$$

$C_2Cl_3F_3$, $C_2Cl_4F_2$ and traces of $CClF_3$. It is seen that very little fragmentation of the ethane structure occurred and excellent yields of fully halogenated ethanes were obtained.

Example 7

A mixture consisting of 274 g. $C_2Cl_4F_2$ and 69 g.

$$C_2Cl_5F$$

obtained by the reaction of perchloroethylene with chlorine trifluoride in the liquid phase followed immediately by treatment of the intermediate product with chlorine monofluoride, also in the liquid phase, was passed in the vapour state through the reactor of Example 1 together with 210 g. of chlorine monofluoride over a period of 3.6 hours with a reaction temperature of 225±30° C. The exit gases were passed immediately through a second and similar reactor at 445±10° C. 171 g. of product were obtained, of which 88% was $C_2Cl_2F_4$, and the remainder was $C_2ClF_5$ and $C_2Cl_3F_3$.

Example 8

Chlorine (10 parts by weight per hour) and chlorine trifluoride (15.3 parts by weight per hour) were passed through a tubular nickel reactor 2 in. diameter x 24 in. long, packed with nickel turnings and heated to 370° C. in an electric furnace. The chlorine monofluoride so produced was freed from small amounts of unreacted chlorine and chlorine trifluoride by passage through a condenser cooled to −70° C. The chlorine monofluoride was then fed in admixture with dichlorodifluoromethane vapour (46 parts by weight per hour) through a second tubular nickel reactor 2 in. diameter x 24 in. long, packed with nickel turnings and maintained at a temperature of 480–490° C. The gases leaving the reactor were scrubbed successively by a mixture of sodium chloride and calcium chloride at 80° C. and by aqueous caustic soda before being condensed in successive traps cooled by "Drikold"/trichloroethylene and by liquid air respectively. In 4 hours there were collected in the traps 136 parts by weight of product, which by gas phase chromatographic analysis was found to contain chlorotrifluoromethane (123 parts) and dichlorodifluoromethane (13 parts).

What I claim is:

1. A process for the manufacture of organic compounds containing fluorine which comprises bringing into reaction in the vapor phase a compound selected from the group consisting of chlorine trifluoride and chlorine monofluoride with a hydrocarbon containing halogen substituents not all of which are fluorine.

2. A process according to claim 1, wherein the hydrocarbon containing halogen substituents is a partially halogenated paraffinic hydrocarbon in which the atomic ratio of hydrogen to halogen does not exceed 1:1.

3. A process according to claim 1, wherein the hydrocarbon containing halogen substituents is a fully halogenated paraffinic hydrocarbon.

4. A process according to claim 1, wherein the hydrocarbon containing halogen substituents is a fully halogenated olefinic hydrocarbon.

5. A process according to claim 1 wherein the vapours of the chlorine fluoride and the halogenated hydrocarbon are passed together through a reaction tube, maintained at the desired reaction temperature.

6. A process according to claim 1 wherein the halogen substituents in the hydrocarbon are selected from the group consisting of (a) chlorine and (b) chlorine and fluorine.

7. A process according to claim 1 wherein the hydrocarbon containing halogen substituents is prepared in a preliminary chlorination by first passing a halogenated hydrocarbon containing a proportion of unsubstituted hydrogen through a hot reaction zone in admixture with sufficient chlorine gas to bring about substitution of substantially all the hydrogen by chlorine.

8. A process as claimed in claim 7 wherein the hot product gases from the preliminary chlorination stage are brought directly into reaction with a chlorine fluoride.

9. A process as claimed in claim 7 wherein hydrogen chloride is removed from the hot product gases leaving the preliminary chlorination stage before said gases are brought into reaction with the chlorine fluoride.

References Cited in the file of this patent

UNITED STATES PATENTS 1,961,622   Nutting et al. _____ June 5, 1934

FOREIGN PATENTS 665,253   Great Britain _____ Jan. 16, 1952
738,289   Great Britain _____ Oct. 12, 1955
761,053   Great Britain _____ Nov. 7, 1956

OTHER REFERENCES

Stacey et al.: Advance in Fluorine Chemistry (volume 1), Butterworths Scientific Publication (1960), pages 17–28.